(12) United States Patent
Sueishi

(10) Patent No.: US 10,857,837 B2
(45) Date of Patent: Dec. 8, 2020

(54) TIRE

(71) Applicant: Sumitomo Rubber Industries, Ltd., Kobe-shi, Hyogo (JP)

(72) Inventor: Makoto Sueishi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 224 days.

(21) Appl. No.: 15/848,132

(22) Filed: Dec. 20, 2017

(65) Prior Publication Data

US 2018/0178588 A1 Jun. 28, 2018

(30) Foreign Application Priority Data

Dec. 22, 2016 (JP) ................................. 2016-249686

(51) Int. Cl.
  *B60C 11/11* (2006.01)
  *B60C 11/13* (2006.01)
  *B60C 11/03* (2006.01)

(52) U.S. Cl.
  CPC ............. *B60C 11/11* (2013.01); *B60C 11/033* (2013.01); *B60C 11/1376* (2013.01); *B60C 11/0332* (2013.01); *B60C 2200/10* (2013.01); *B60C 2200/14* (2013.01)

(58) Field of Classification Search
  CPC ......... B60C 11/11; B60C 11/12; B60C 11/13; B60C 11/1369
  See application file for complete search history.

(56) References Cited

U.S. PATENT DOCUMENTS

| 8,631,845 B2 * | 1/2014 | Ishida | B60C 11/11 |
| | | | 152/209.11 |
| 2014/0041778 A1 * | 2/2014 | Ichiryu | B60C 11/11 |
| | | | 152/209.18 |
| 2014/0209227 A1 | 7/2014 | Maeda | |

FOREIGN PATENT DOCUMENTS

| EP | 2 657 048 A1 | 10/2013 |
| EP | 2 682 283 A1 | 1/2014 |
| EP | 2 990 233 A1 | 3/2016 |
| JP | 2014-141163 A | 8/2014 |
| JP | 2014-144752 A | 8/2014 |

OTHER PUBLICATIONS

Extended European Search Report dated May 7, 2018, in European Patent Application No. 17206110.3.

* cited by examiner

*Primary Examiner* — Alison L Hindenlang
*Assistant Examiner* — Shibin Liang
(74) *Attorney, Agent, or Firm* — Birch, Stewart, Kolasch & Birch, LLP

(57) ABSTRACT

A tire 1 comprises a tread portion 2 provided with blocks 10 so that the tread portion has a land ratio of from 18% to 35%. The blocks 10 include grooved blocks 10 provided with a zoning groove 16 which defines a tall section 12 of the grooved block having a ground contacting higher top surface 13, and a short section 14 of the grooved block having a ground contacting lower top surface 15 positioned radially inside the higher top surface 13. The depth da of the zoning groove 15 measured from the lower top surface 15 is less than 20% of the maximum radial height H1 of the grooved block 10.

20 Claims, 8 Drawing Sheets

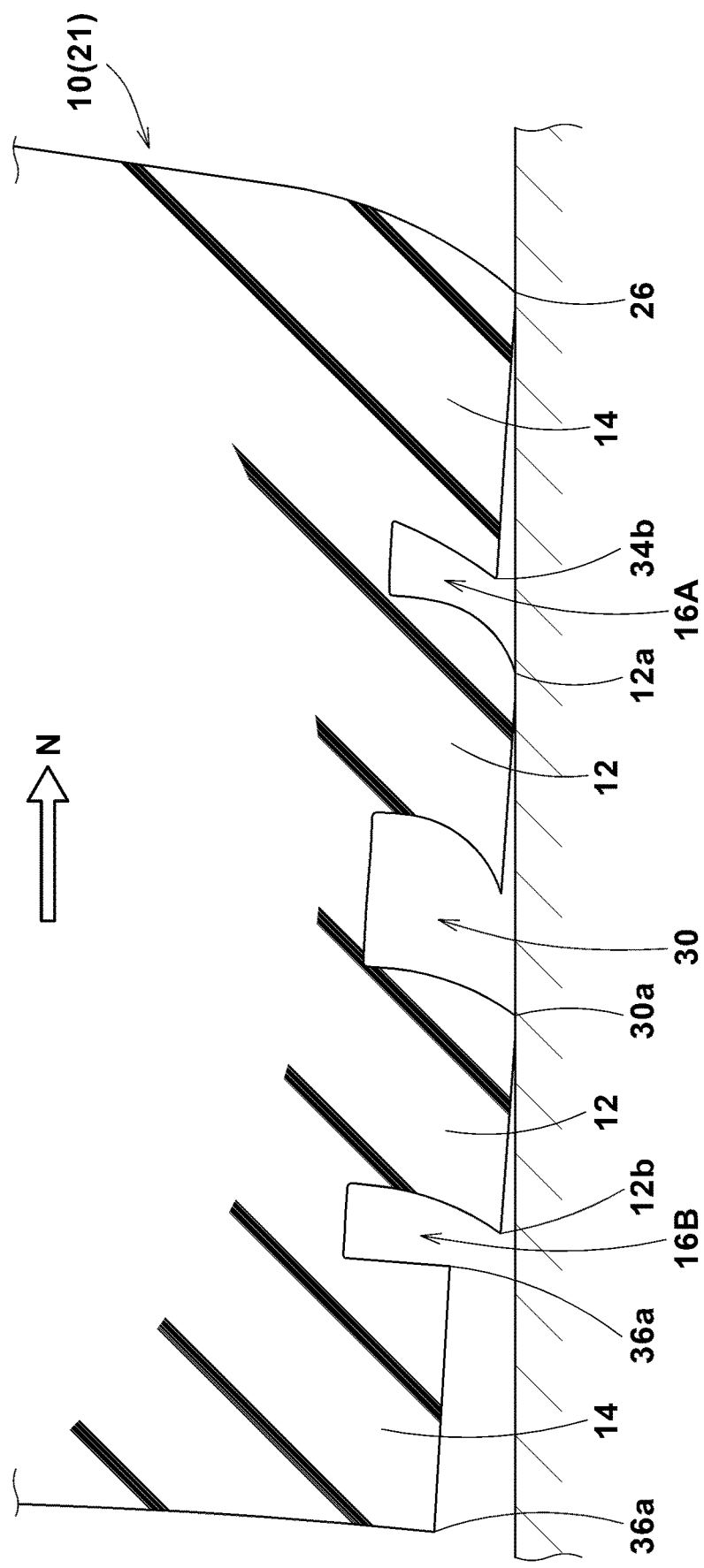

TIRE

TECHNICAL FIELD

The present invention relates to a tire whose tread portion is provided with blocks capable of improving grip performance of the tire by increasing edge effect of blocks, while maintaining durability of the blocks.

BACKGROUND ART

In a motorcycle tire for off-road use, for example, used in motocross, the tread portion is usually provided with a block pattern consisting of blocks. When running on rough terrain, e.g. sandy and muddy ground, the edges of the ground contacting top surfaces of the blocks dig into the ground and exert edge effect to provide grip performance.

It is conceivable to improve the grip performance by providing grooves and sipes for the top surfaces of the blocks to increase the blocks' edges.
In such blocks, however, the edge effect is reduced despite the intention as the blocks' rigidity is reduced and the blocks' edges are worn early. Thus, there is a problem such that the grip performance is not effectively improved.

SUMMARY OF THE INVENTION

The present invention was made in view of the circumstances described above, and
an object of the present invention is to provide a tire in which the ground contacting top surfaces of tread blocks are improved so as to increase their edge effect, and the grip performance is improved without sacrificing the durability of the blocks.

According to the present invention, a tire comprises:
a tread portion provided with blocks so that the tread portion has a land ratio of from 18% to 35%, wherein
the blocks include a grooved block provided with a zoning groove which defines
a tall section of the grooved block having a ground contacting higher top surface, and
a short section of the grooved block having a ground contacting lower top surface positioned radially inside the higher top surface, and
the depth of the zoning groove measured from the lower top surface is less than 20% of the maximum radial height of the grooved block.

Further, the tire according to the present invention may have the following features (1)-(7):
(1) a plurality of the grooved blocks are disposed as crown blocks, wherein each crown block is defined such that the centroid of the higher top surface is positioned in a crown region of the tread portion which region is defined as being centered on the tire equator and having a developed axial width in a range from 25% to 75% of the developed tread width of the tread portion, and
each of the crown blocks has a substantially rectangular shape in its top view, and the zoning groove is u-shaped with both ends positioned at one of edges of the crown block;
(2) the above-said one edge at which the both ends of the zoning groove are positioned, extends in the tire circumferential direction and is positioned axially outside the above-said centroid;
(3) the above-said tall section is provided with a second groove whose depth is less than 20% of the above-said maximum radial height of the grooved block;
(4) an intended rotation direction of the tire is specified, the above-said short section comprises an axially inner part located on the axially inside of the tall section, and
a heel-side part located on a heel-side of the tall section excluding the axially inner part,
the above-said grooved block satisfies the following condition (1)

$$E \times ML/S > 2.0$$

wherein
S is the total (sq.mm) of the area of the higher top surface and the area of the lower top surface,
ML is the maximum length (mm) in the tire circumferential direction of the grooved block, and
E is the total length (mm) of the axial components of effective heel-side edges of the grooved block, which is the sum of the following lengths E1 to E6:
the length E1 of the axial component of a heel-side block edge of the axially inner part;
the length E2 of the axial component of a heel-side block edge of the heel-side part;
the length E3 of the axial component of a heel-side block edge of the tall section;
the length E4 of the axial component of a heel-side block edge formed by the second groove;
the length E5 of the axial component of a heel-side block edge formed by the zoning groove and positioned axially inside the tall section; and
the length E6 of the axial component of a heel-side block edge formed by the zoning groove and positioned axially outside the tall section;
(5) the grooved block satisfy the following condition (2)

$$D \times ML/S > 0.18$$

wherein D is the smallest value of widths of the tall section and the short portion measured perpendicularly to longitudinal directions of the tall section and the short portion;
(6) the grooved block satisfy the following condition (3)

$$D \times MW/S > 0.18$$

wherein MW is the maximum axial width of the grooved block;
(7) the tire is a motorcycle tire for running on rough terrain in which the tread portion curved in an arc shape swelling radially outwardly in the tire meridian section so that the maximum cross sectional width of the tire occurs between tread edges.

BRIEF DESCRIPTION OF THE DRAWINGS

FIG. 6 is an enlarged diagram for explaining a contact state of the grooved block.

DESCRIPTION OF THE PREFERRED EMBODIMENTS

Embodiments of the present invention will now be described in conjunction with accompanying drawings.

The present invention is suitably applied to a motorcycle tire for running on rough terrain, for example, used in motocross race.

In the following embodiments, motorcycle tires 1 according to the present invention are pneumatic tires.

Figure 1:
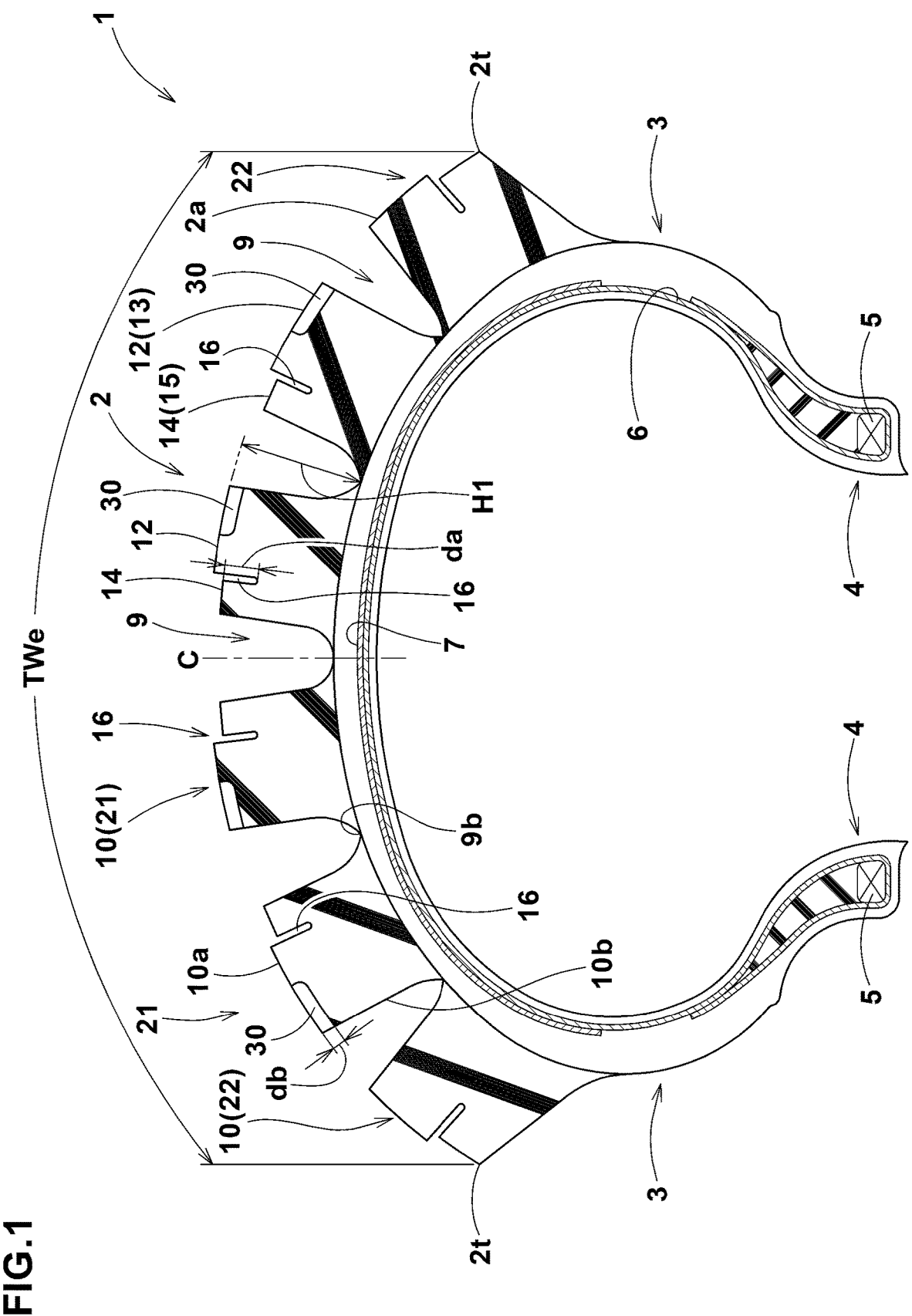
FIG. 1 is a cross-sectional view showing a tire as an embodiment of the present invention which is taken along line A-A in FIG. 2.

FIG. 1 shows a meridian cross section of the tire 1 under its normally inflated unloaded condition.

The normally inflated unloaded condition is such that the tire is mounted on a standard wheel rim and inflated to a standard pressure but loaded with no tire load.

The standard wheel rim is a wheel rim officially approved or recommended for the ti re by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and a standard tire load are the maximum air pressure and the maximum tire load for the tire specified by the same organization in the Air-pressure/maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

According to the present invention, an intended tire rotational direction N may be specified in order to effectively bring out performance of tread patterns provided in the tread portion 2 and configurations of the grooved blocks. such intended rotational direction N may be indicated in the sidewall portions 3 of the tire.

In the following description, mainly for purposes of explanation of the function of the grooved block 10, the tire rotational direction N is used and indicated in the figures. In connection with the tire rotational direction N, the terms "heel-side" and "toe-side" are used, wherein the heel-side is intended toward the tire rotational direction N, and the toe-side is intended toward the opposite direction to the tire rotational direction N.

The tire 1 comprises a tread portion 2 whose radially outer surface defines the tread, a pair of axially spaced bead portions 4 mounted on rim seats and each provided with a bead core 5, a pair of sidewall portions 3 extending between the tread edges and the bead portions, a carcass 6 extending between the bead portions through the tread portion and the sidewall portions, and secured to the bead cores, and a tread reinforcing cord layer 7 disposed radially outside the carcass in the tread portion.

As a characteristic of a motorcycle tire, the tread portion 2 (inclusive of the carcass, tread reinforcing cord layer and a tread rubber thereon) is convexly curved so that the tread face 2a between the tread edges 2t is curved like an arc swelling radially outwardly, and the maximum cross sectional width of the tire 1 occurs between the tread edges 2t, namely, equals to the axial tread width.

In the drawings, "TWe" denotes a developed tread width between the tread edges 2t along the tread face 2a.

Figure 2:
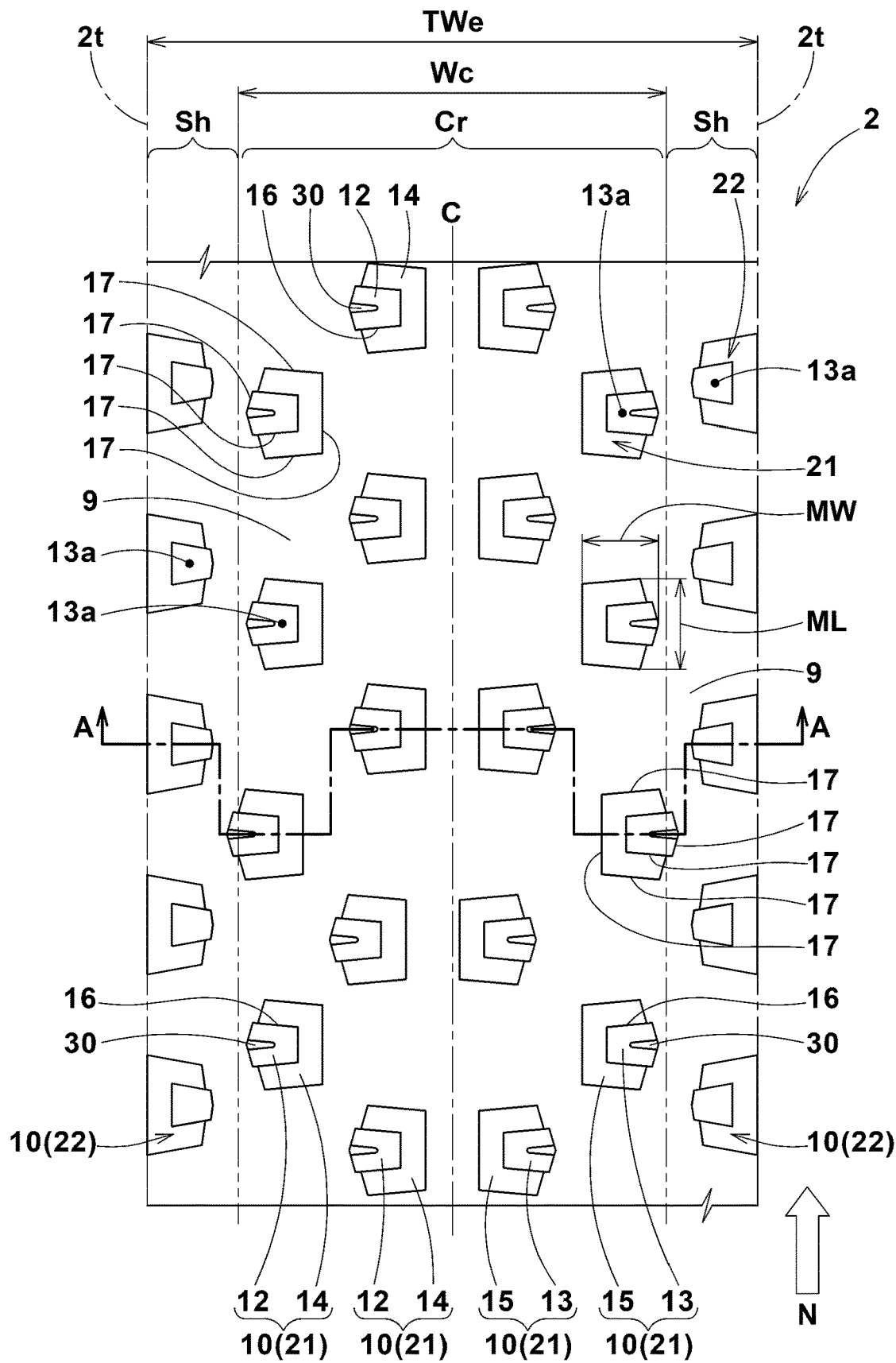
FIG. 2 is a developed partial view of the tread portion thereof.

The tread portion 2 is provided with a plurality of blocks 10 rising from the tread base independently as shown in FIGS. 1 and 2. The tread base corresponds to bottoms 9b of tread grooves 9. Due to the low land ratio of the tread portion 2, the term "tread base" is used.

Preferably, the land ratio of the tread portion 2 is set in a range of not less than 18%, more preferably not less than 20%, but not more than 35%, more preferably not more than 28%. Incidentally, the land ratio (or positive ratio) is a ratio (Lb/L) of the total ground contacting area Lb of the blocks to the overall tread area L.

If the land ratio (Lb/L) is less than 18%, the rigidity of the blocks is reduced, and the grip performance on hard ground such as dry asphalt road surface is reduced. If the land ratio of (Lb/L) is more than 35%, there is a possibility that the edge effect is reduced, and the grip performance on soft ground is deteriorated.

The blocks 10 each have a ground contacting top surface 10a and a sidewall surface 10b extending radially inwardly from the peripheral edge of the top surface 10a to the tread base (9b).

Figure 3:
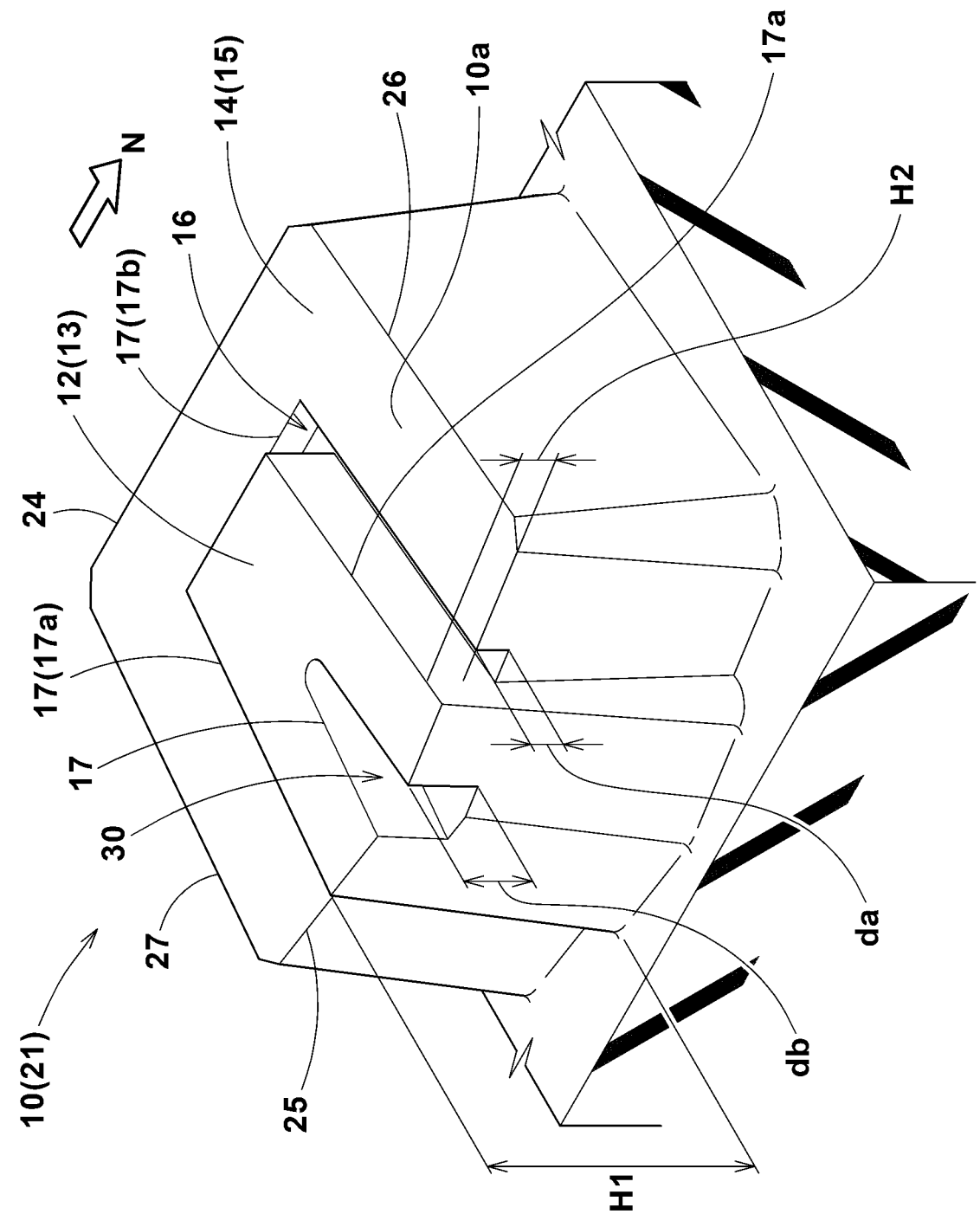
FIG. 3 is a perspective view of an example of the grooved block disposed in the tread portion.

The blocks 10 include a grooved block 10 as shown in FIG. 3, wherein the top surface 10a of the grooved block 10 is provided with a zoning groove 16 dividing the block into a tall section 12 having a higher top surface 13, and a short section 14 having a lower top surface 15 positioned radially inside the higher top surface 13.

As the grooved block 10 has two sections 12 and 14 having different radial heights, the edges 17 of the grooved block are increased which makes it possible to exhibit high edge effect. Further, owing to the zoning groove 16, the tall section 12 can be separated from the short section 14 during running, which also enhance the edge effect.

Preferably, the difference H2 in the radial height between the higher top surface 13 of the tall section 12 and the lower top surface 15 of the short section 14 is set in a range from 0.3 to 3.0 mm. If the height difference H2 is small, the edge effect from the edge 17a of the tall section 12 may not be effectively improved. If the height difference H2 is large, there is a possibility that the stiffness of the tall section 12 becomes insufficient.

Here, as shown in FIG. 2, annular regions of the tread portion 2 are defined as follows: a crown region Cr centered on the tire equator C and having a developed axial width we in a range from 25% to 75% of the developed tread width TWe, and a pair of shoulder regions Sh on both sides of the crown region Cr, namely, each extending from the crown region Cr to one of the tread edges. The crown region Cr is a region contacting with the ground from straight running conditions to cornering conditions with the moderately leant vehicle body and thus subjected to large loads due to acceleration and deceleration. The shoulder region Sh is a region contacting with the ground from cornering conditions with the moderately leant vehicle body to cornering conditions with the largely leant vehicle body, therefore, the opportunity to contact with the ground is less than the crown region Cr.

Therefore, it is effectual to provide the grooved blocks 10 for the crown region Cr. It is possible that the grooved blocks 10 are disposed in only the crown region Cr. But, in the present embodiment shown in FIG. 2, each of the blocks 10 is the grooved block 10.

In the present embodiment, the blocks 10 include crown blocks 21 (grooved blocks 10) each defined such that the centroid 13a of the higher top surface 13 is disposed in the crown region Cr; and shoulder blocks 22 (grooved blocks 10) each defined such that the centroid 13*a* of the higher top surface 13 is disposed in the shoulder region Sh.

In the tread pattern shown in FIG. 2, the shoulder block 22 in each shoulder region Sh are arranged in the tire circumferential direction along the tread edge. The crown blocks 21 are arranged in the tire circumferential direction and the tire axial direction.

In each of the grooved blocks 10, the groove depth (da) of the zoning groove 16 measured from the lower top surface 15 is set to be less than 20% of the maximum radial height H1 of the grooved block 10. Thus, the rigidity of the grooved block 10 is kept high, thereby the durability of the grooved block 10 is maintained. However, if the groove depth (da) of the zoning groove 16 is excessively small, the separation between the tall section 12 and the short section 14 becomes insufficient, and the edge effect is reduced. Therefore, it is preferable that the groove depth (da) of the zoning groove 16 is more than 5% of the maximum height H1 of the grooved block 10.

From the similar reasons, the groove width Wa of the zoning groove 16 is preferably set to be not less than 0.5 mm and not more than 3.0 mm.

Figure 4:
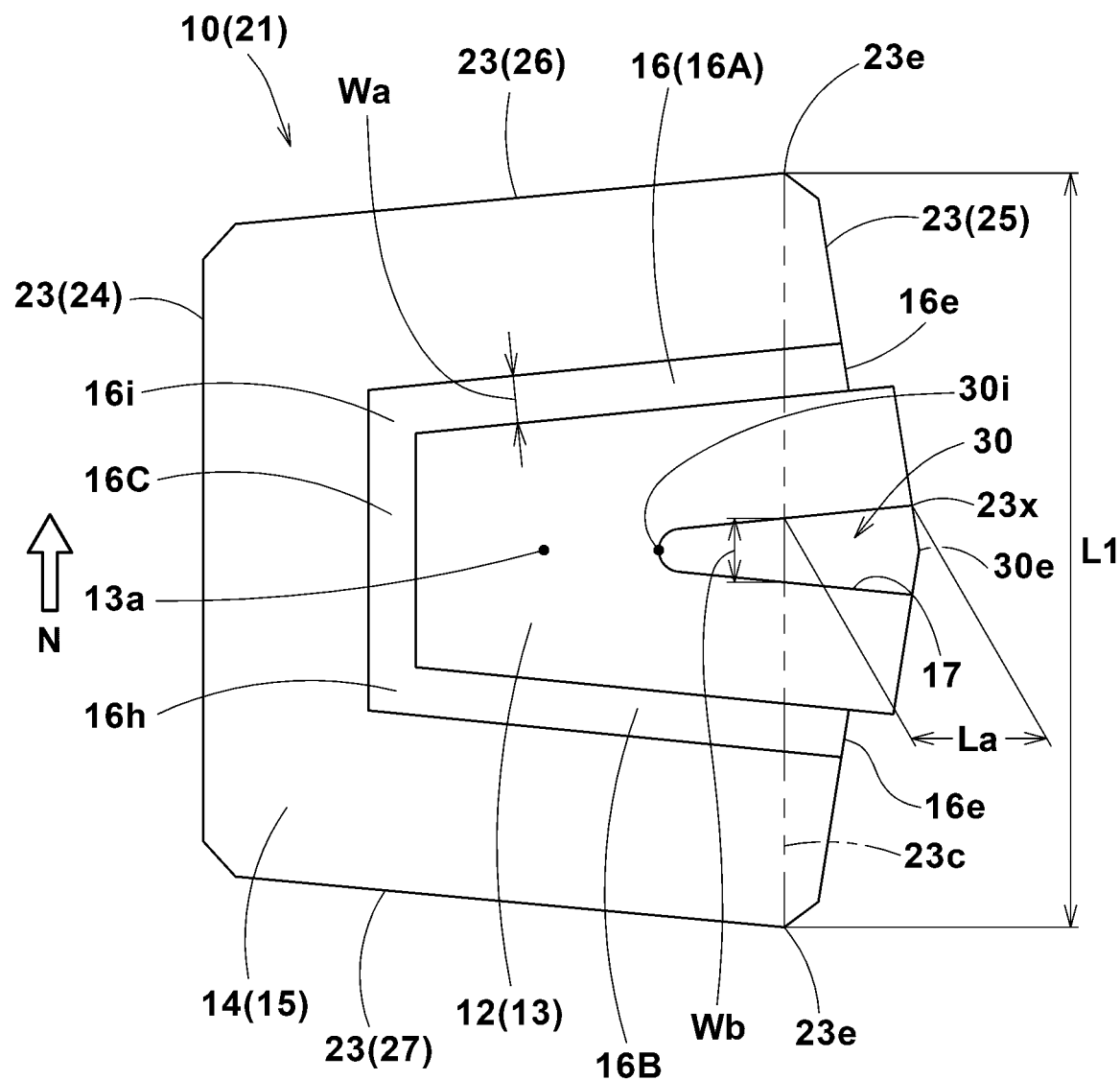
FIG. 4 and FIG. 5 are a top view of the grooved block disposed in a tread crown portion as a crown block.

In FIG. 4 which is a top view of the crown block 21 (grooved block 10) in this embodiment, the crown block 21 has a generally rectangular shape having four sides or edges 23 extending substantially straight. The four edges 23 are an axially inner circumferential edge 24 extending in the tire circumferential direction and disposed on the axially inside of the centroid 13*a*, an axially outer circumferential edge 25 extending in the tire circumferential direction and disposed on the axially outside of the axially inner circumferential edge 24, a heel-side axial edge 26 extending in the tire axial direction and disposed on the heel-side of the centroid 13*a* and between the axially inner circumferential edge 24 and the axially outer circumferential edge 25, and a toe-side axial edge 27 extending in the tire axial direction and disposed on the toe-side of the centroid 13*a* of and between the axially inner circumferential edge 24 and the axially outer circumferential edge 25.

Here, the expression "edge extending substantially straight" means a linear edge as well as a nonlinear edge 23 (such as the axially outer circumferential edge 25) whose most deviated point 23*x* from a straight line 23*c* drawn between both ends 23*e* of the edge 23 is at a distance La of not more than 30% of the length L1 of the straight line 23*c* from the straight line 23*c*.

The axially inner circumferential edge 24, the heel-side axial edge 26 and the toe-side axial edge 27 are subjected to large forces at the time of acceleration and deceleration during straight running and cornering. The axially outer circumferential edge 25 is subjected to smaller forces when compared with the axially inner circumferential edge 24, the heel-side axial edge 26 and the toe-side axial edge 27.

The above-mentioned zoning groove 16 of the grooved block 10 (crown block 21) is u-shaped, having both ends 16*e* opened at one of the edges 23 which is, in this embodiment, the axially outer circumferential edge 25. That is, the zoning groove 16 does not reach to the axially inner circumferential edge 24, the heel-side axial edge 26 and the toe-side axial edge 27 which edges are subjected to relatively large forces. Thereby, the rigidity of the block is kept high, and the durability of the block is ensured.

The zoning groove 16 is composed of a first portion 16A, a second portion 16B and a third portion 16C.

The first and second portions 16A and 16B extend axially inwardly from the axially outer circumferential edge 25.

The third portion 16C extends in the tire circumferential direction between the axially inner end 16*i* of the first portion 16A and the axially inner end 16*h* of the second portion 16B.

The second portion 16B is positioned on the toe-side of the first portion 16A.

In the present embodiment, each of the first, second and third portions 16A-16C extends straight. Such zoning groove 16 can enhance the edge effect of the block edges.

In the present embodiment, the higher top surface 13 of the tall section 12 is substantially rectangular.

In the present embodiment, the grooved block 10 as the crown block 21 is provided with a second groove 30 disposed in the higher top surface 13 of the tall section 12 in order to increase the block edges 17 to further improve the grip performance.

In the present embodiment, the second groove 30 extends straight in the tire axial direction so that an axially inner end 30*i* is terminated within the higher top surface 13, and an axially outer end 30*e* is opened at the axially outer circumferential edge 25. Such second groove 30 secures its length, while maintaining a high rigidity of the tall section 12, therefore, the durability and the grip performance is improved in good balance.

It is preferable that an average groove width Wb of the second groove 30 is set in a range from 1.0 to 4.0 mm.

If the width Wb is large, there is a possibility that the rigidity of the tall section 12 becomes insufficient. If the width Wb is small, there is a possibility that the second groove 30 is closed when the tall section 12 contacting with the ground, and the edge effect can not be effectively exhibited.

From a similar point of view, it is preferable that the groove depth db of the second groove 30 is in a range from 5% to 20% of the maximum height H1 of the grooved block 10.

In the present embodiment, the short section 14 is substantially u-shaped in its top view and surrounded by the heel-side axial edge 26, the toe-side axial edge 27, the axially inner circumferential edge 24 and the zoning groove 16.

Figure 5:
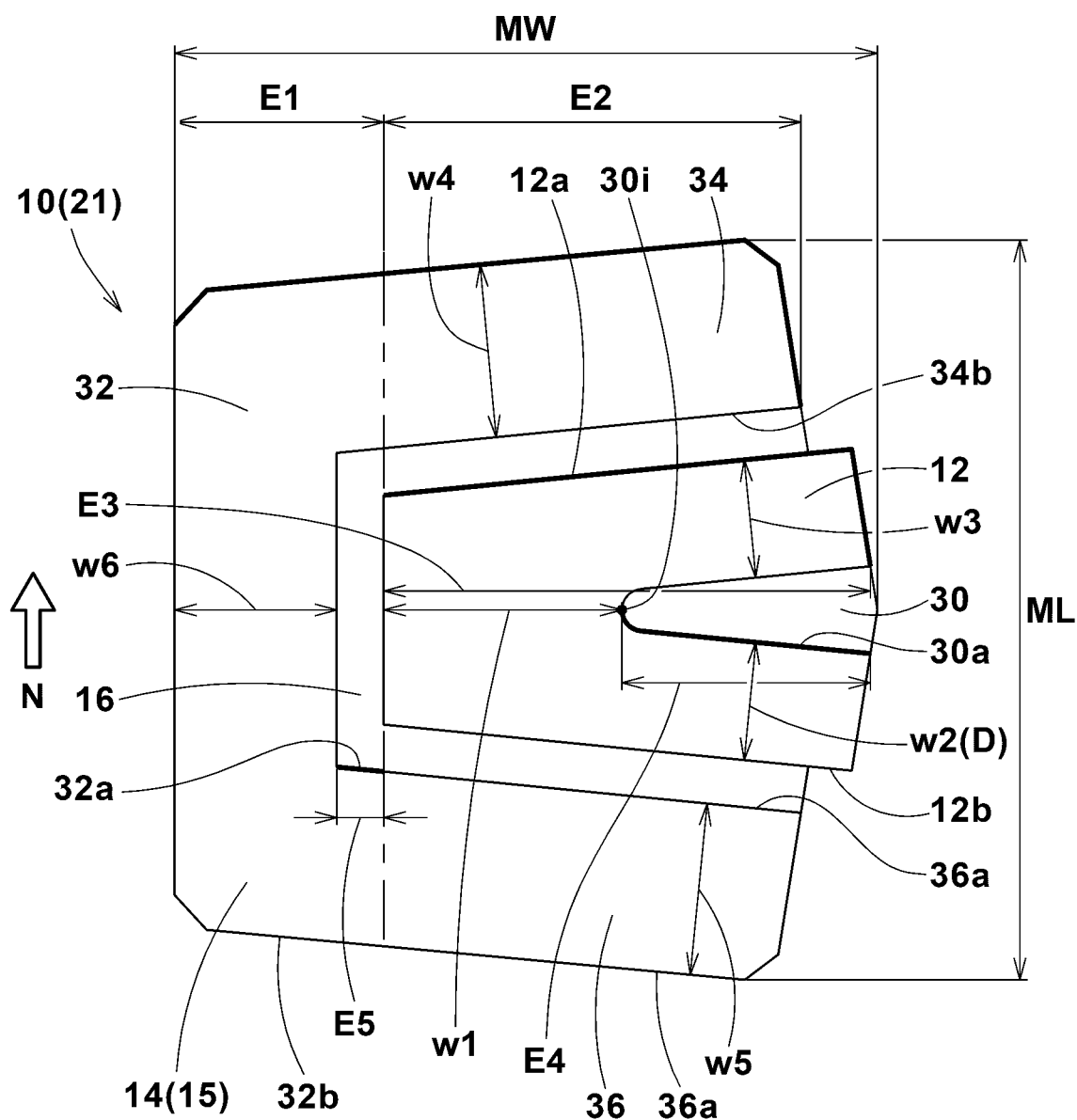

In the present embodiment, as shown in FIG. 5, the short section 14 comprises an axially inner part 32, a heel-side part 34 and a toe-side part 36.

In FIG. 5, the alternate long and two short dashes line shows the boundary between the axially inner part 32 and the heel-side and toe-side parts 34 and 36.

As shown, the axially inner part 32 is the part located on the axially inside of the tall section 12.

The heel-side part 34 is a part located on the heel-side in the tire rotational direction N of the tall section 12 excluding the axially inner part 32.

The toe-side part 36 is a part located on the toe-side in the tire rotational direction N of the tall section 12 excluding the axially inner part 32.

As shown in FIG. 5, as the tall section 12 is positioned on the toe-side of the heel-side part 34 and the higher top surface 13 is positioned on the radially outside of the lower top surface 15, in the ground contacting patch, as shown in FIG. 6, the heel-side axial edge 26 digs into the ground and can exert a significant edge effect, and the heel-side block edge 12*a* of the tall section 12 digs into the ground and can exert a large edge effect.

Further, the heel-side block edge 30*a* formed by the second groove 30 also exerts a large edge effect.

Furthermore, the heel-side block edge 32*a* formed by the zoning groove 16 and positioned axially inside the tall section 12 also exerts the edge effect.

These heel-side edges are effective for improving the edge effect of the grooved block (hereinafter the effective heel-side edges). In FIG. 5, such effective heel-side edges are indicated by heavy line.

On the other hand, as the toe-side part 36 is positioned on the toe-side of the tall section 12, a heel-side block edge portion 36a and the toe-side block edge 36a of the toe-side part 36 behind the tall section 12 have less opportunity to exhibit a high edge effect.

Further, the toe-side block edge 32b of the axially inner part 32, the toe-side block edge 34b of the heel-side part 34, the toe-side block edge 12b of the tall section 12, and the toe-side block edge formed by the second groove 30 also have less opportunity to exhibit a high edge effect.

These edges and edge portion are less effective for improving the edge effect of the grooved block (hereinafter the less effective block edges). In FIG. 5, the less effective block edges are indicated by thin line.

When the minimum block width of the tall section 12 or the block width of the short section 14 is small, the rigidity of the block 10 is reduced, and there is a possibility that the durability is deteriorated.

From this point of view, according to the present invention, the following conditions (1) to (3) are satisfied in order to improve the grip performance and the durability in good balance.

$$E \times ML/S > 2.0 \quad \text{Condition (1)}$$

wherein

S is the total (sq.mm) of the area S1 of the higher top surface 13 and the area S2 of the lower top surface 15, ML is the maximum length (mm) in the tire circumferential direction of the grooved block 10, and E is the total length (mm) of the axial components of the effective heel-side edges.

Figure 8:
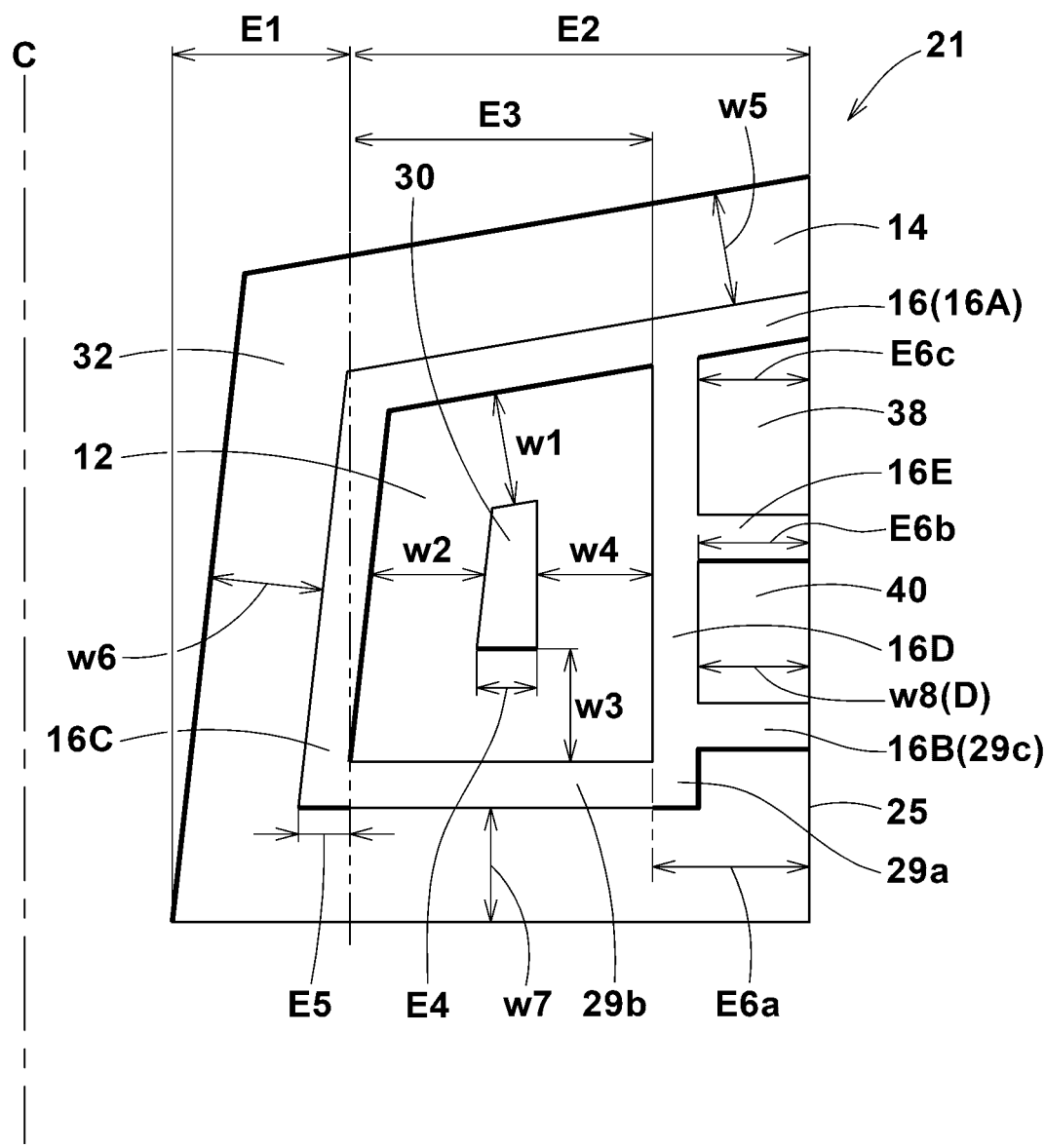

The total length E is the sum of the following lengths E1 to E6:

the length E1 of the axial component of the heel-side block edge of the axially inner part 32;

the length E2 of the axial component of the heel-side block edge of the heel-side part 34;

the length E3 of the axial component of the heel-side block edge of the tall section 12;

the length E4 of the axial component of the heel-side block edge formed by the second groove 30;

the length E5 of the axial component of the heel-side block edge 32a formed by the zoning groove 16 and positioned axially inside the tall section 12;

the length E6 of the axial component of the heel-side block edge formed by the zoning groove 16 and positioned axially outside the tall section 12 in the example shown in FIG. 8.

In the embodiment shown in FIG. 1, the zoning groove 16 does not form a heel-side block edge positioned axially outside the tall section 12, therefore, the length E6 is zero.

$$D \times ML/S > 0.18 \quad \text{Condition (2)}$$

wherein

D is the smallest value of widths w1, w2, w3 - - - (mm) of portions of the grooved block 10 divided by the groove(s).

In the crown block 21 in the present embodiment shown in FIG. 5, block widths w1 to w3 are acquired from the tall section 12, and block widths w4 to w6 are acquired from the short section 14, and the block width w2 from the tall section 12 is adopted to the smallest value D.

$$D \times MW/S > 0.18 \quad \text{Condition (3)}$$

wherein

MW is the maximum axial width (mm) of the grooved block 10.

In order to secure the rigidity of the blocks 10 so as to exhibit a high edge effect, it is preferred that a tread rubber forming the blocks 10 has a durometer A hardness of from 68 to 85 degrees measured according to JIS-K6253 at a temperature 25 degrees C.

Figure 7A:
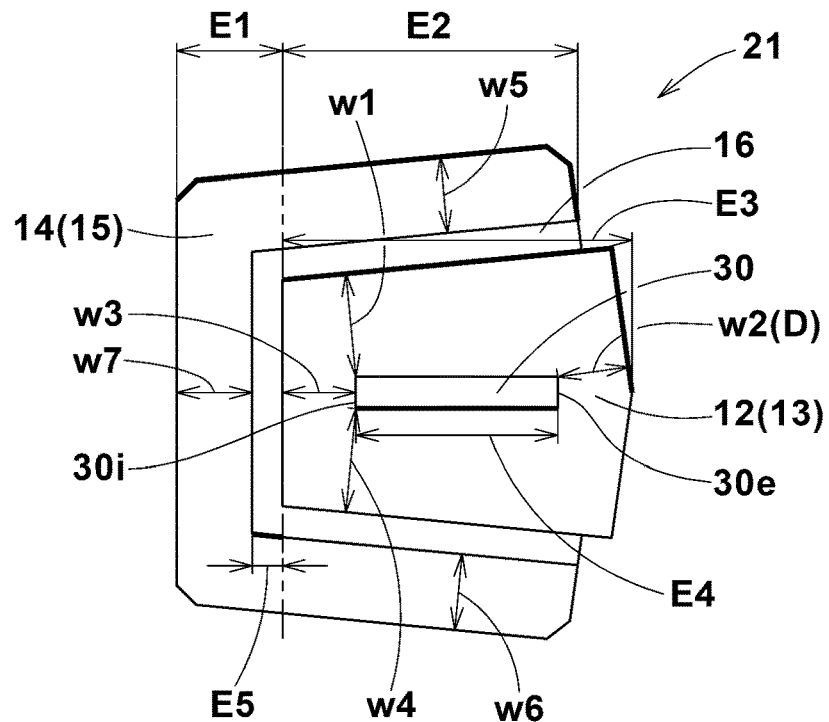
FIG. 7(*a*), FIG. 7(*b*) and FIG. 8 are top views each showing another example of the grooved block.

FIG. 7(a) shows another example of the grooved block 10 (crown block 21) which can be employed alone or in combination with the formed example as another embodiment of the present invention. In this example, the second groove 30 has both axial ends 30e and 30i closed within the tall section 12 in order to increase the rigidity of the tall section 12 and thereby to improve the durability.

In FIG. 7(a), the effective heel-side edges are indicated by heavy line as in the former example.

The total length E (mm) of the axial components of the effective heel-side edges is given by the sum of the lengths E1 to E6 wherein E6 is zero as in the former example.

Among the widths w1 to w4 obtained from the tall section 12 and the widths w5 to w7 obtained from the short section 14, w2 measured at the outer end 30e of the second groove 30 is adopted as the smallest value D.

Figure 7B:
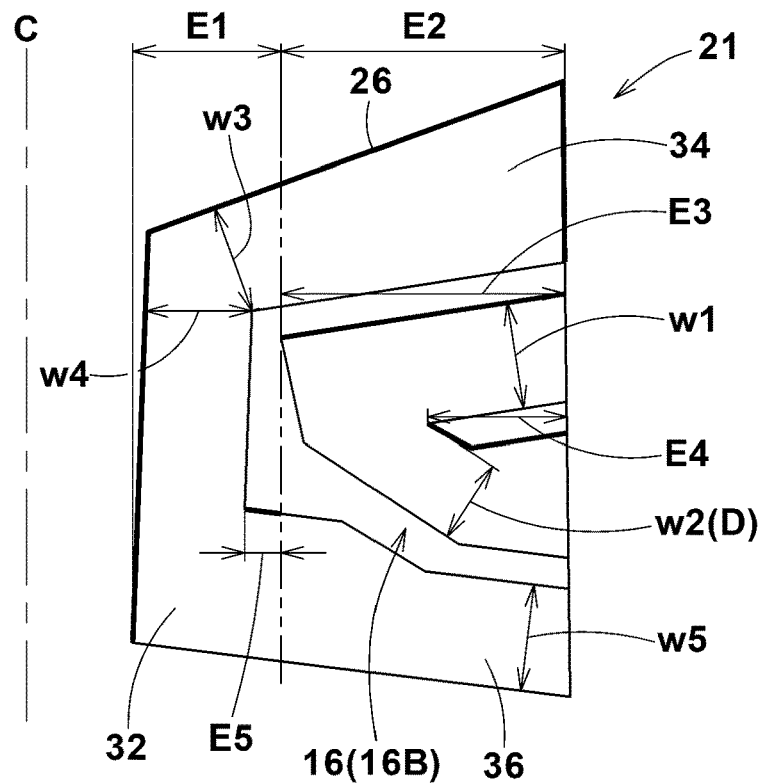

FIG. 7(b) shows still another example of the grooved block 10 (crown block 21) which can be employed alone or in combination with the former examples as another embodiment of the present invention.

As shown, the heel-side axial edge 26 is inclined with respect to the tire axial direction at a larger angle when compared with the former examples.

Further, the second portion 16B of the zoning groove 16 extends in a zigzag shape.

This example is used so that the second portion 16B is positioned on the toe-side in relation to the intended tire rotational direction N, and the heel-side axial edge 26 is actually positioned on the heel-side.

In FIG. 7(b), the effective heel-side edges are indicated by heavy line.

The total length E (mm) of the axial components of the effective heel-side edges is given by the sum of the lengths E1 to E6 wherein E6 is zero.

Among the widths w1 and w2 obtained from the tall section 12 and the widths w3 to w5 obtained from the short section 14, w2 obtained from the tall section 12 is adopted as the smallest value D.

FIG. 8 shows yet another example of the grooved block 10 (crown block 21) which can be employed alone or in combination with the formed examples as another embodiment of the present invention.

As shown, the zoning groove 16 in this example comprises, in addition to the above-said first portion 16A, second portion 16B and third portion 16C, a fourth portion 16D and a fifth portion 16E.

The fourth portion 16D is disposed on the axially outside of the third portion 16C and extended in the tire circumferential direction so as to connect between the first portion 16A and the second portion 16B.

The fifth portion 16E extends in the tire axial direction from the fourth portion 16D to the axially outer circumferential edge 25.

The second portion 16B in this example is composed of a major first axial portion 29b extending in the tire axial direction from the third portion 16C toward the axially outer circumferential edge 25, a circumferential portion 29a extending in the tire circumferential direction from the first axial portion 29b toward the heel-side axial edge 26, and
a second axial portion 29c extending in the tire axial direction from one end of the circumferential portion 29a to the axially outer circumferential edge 25.

The second groove 30 in this example has both ends terminated within the higher top surface 13, namely, it is an independent groove not connected to any of the grooves.

Thus, the short section 14 comprises an axially outer heel-side part 38 and an axially outer toe-side part 40 on the toe-side thereof in addition to the above-said axially inner part 32, heel-side part 34 and toe-side part 36.
The axially outer heel-side part 38 is divided by the first portion 16A, the fifth portion 16E and the fourth part 16D and has a rectangular shape in the plan view.
The axially outer toe-side part 40 is divided by the fifth portion 16E, the second portion 16B and the fourth part 16D and has a rectangular shape in the plan view.

In the grooved block 10 (crown block 21) in this example, the effective heel-side edges exist on the axially outer side of the tall section 12. Therefore, there is a positive length E6 to be added to the above-mentioned total length E.
In this example, the length E6 is the sum of E6a, E6b and E6c:

E6a is the length of the axial component of a heel-side block edge formed by a part of the second portion 16B axially outside the tall section 12;
E6b is the length of the axial component of the heel-side block edge of the axially outer toe-side part 40; and
E6c is the length of the axial component of the heel-side block edge of the axially outer heel-side part 38.
In FIG. 8, these effective heel-side block edges are indicated in heavy line.
This example shown in FIG. 8 is used so that the axially outer heel-side part 38 and the axially outer toe-side part 40 are actually positioned on the heel-side and the toe-side, respectively, in relation to the intended tire rotational direction N.
Among the widths w1 to w4 obtained from the tall section 12 and the widths w5 to w8 obtained from the short section 14, w8 from the outer heel-side part 38 and the outer toe-side part 40 is adopted as the smallest value D.

While detailed description has been made of preferable embodiments of the present invention, the present invention can be embodied in various forms without being limited to the illustrated embodiment.

Comparison Tests

Based on the tread pattern shown in FIG. 2 (land ratio 27%), motorcycle tires for running on rough terrain having the structure shown in FIG. 1 was experimentally manufactured as test tires Ref and Ex1-Ex13.
The specifications are shown in Table 1.
The test tires were tested for the grip performance and block durability. Common specifications are as follows. test vehicle: 450 cc motocross bike
front tire size: 80/100-21 (rim size 21×1.85), pressure 80 kPa
rear tire size: 120/80-19 (rim size 19×2.15), pressure 80 kPa
<Grip Performance Test>
The test tires were mounted on the test vehicle, and during running on a rough road surface of a test course, the test rider evaluated the grip performance. The results are indicated in Table 1 by an index based on Reference tire Ref being 100, wherein the larger the value, the better the grip performance.
<Durability Test>
After running in the grip performance test, the blocks were visually checked for the occurrence of chipping off and wear condition. The results are indicated in Table 1 by an index based on Reference tire Ref being 100, wherein the larger the value, the better the durability of the blocks.

TABLE 1

| Tire | Ref | Ex1 | Ex2 | Ex3 | Ex4 | Ex5 | Ex6 |
|---|---|---|---|---|---|---|---|
| da/H1 (%) | 20 | 15 | 10 | 5 | 15 | 15 | 15 |
| db/H1 (%) | 15 | 15 | 15 | 15 | 25 | 20 | 5 |
| ExML/S | 2.03 | 2.03 | 2.03 | 2.03 | 2.03 | 2.03 | 2.03 |
| DxML/S | 0.19 | 0.19 | 0.19 | 0.19 | 0.19 | 0.19 | 0.19 |
| DxMW/S | 0.19 | 0.19 | 0.19 | 0.19 | 0.19 | 0.19 | 0.19 |
| Grip performance | 100 | 107 | 104 | 102 | 106 | 106 | 102 |
| Durability | 100 | 110 | 112 | 112 | 107 | 108 | 112 |

| Tire | Ex7 | Ex8 | Ex9 | Ex10 | Ex11 | Ex12 | Ex13 |
|---|---|---|---|---|---|---|---|
| da/H1 (%) | 15 | 15 | 15 | 15 | 15 | 15 | 15 |
| db/H1 (%) | 15 | 15 | 15 | 15 | 15 | 15 | 15 |
| ExML/S | 1.94 | 2.03 | 2.03 | 1.94 | 1.94 | 1.94 | 2.03 |
| DxML/S | 0.19 | 0.17 | 0.19 | 0.17 | 0.17 | 0.19 | 0.17 |
| DxMW/S | 0.19 | 0.19 | 0.17 | 0.17 | 0.19 | 0.17 | 0.17 |
| Grip performance | 106 | 106 | 107 | 104 | 106 | 105 | 107 |
| Durability | 108 | 109 | 108 | 107 | 107 | 108 | 105 |

From the test results, it was confirmed that the tires according to the present invention can be improved in the grip performance and block durability.

DESCRIPTION OF THE REFERENCE SIGNS 1 tire
2 tread portion
10 block
12 tall section
13 higher top surface
14 short section
15 lower top surface
16 zoning groove

The invention claimed is:
1. A tire comprising:
a tread portion provided with blocks so that the tread portion has a land ratio of from 18% to 35%, wherein
the blocks include a grooved block provided with a zoning groove which defines a tall section of the grooved block having a ground contacting higher top surface, and a short section of the grooved block having a ground contacting lower top surface positioned radially inside the higher top surface, and a depth of the zoning groove measured from the lower top surface is less than 20% of a maximum radial height of the grooved block, wherein a plurality of the grooved blocks is disposed as crown blocks, each crown block defined such that the centroid of the higher top surface is positioned in a crown region of the tread portion which region is defined as being centered on the tire equator and having a developed axial width in a range from 25% to 75% of the developed tread width of the tread portion, wherein said plurality of the grooved blocks disposed as the crown blocks are grooved crown blocks disposed on one side of the tire equator and grooved crown blocks disposed on the other side of the tire equator, wherein each of the grooved crown blocks has a substantially rectangular shape in its top view, and the zoning groove is U-shaped with both ends positioned at one of edges of the crown block, and said one of edges is positioned axially outside said centroid and extends in the tire circumferential direction, wherein all blocks disposed within the crown region are said grooved crown blocks disposed on both sides of the tire equator.

2. The tire according to claim 1, wherein said tall section is provided with a second groove whose depth is less than 20% of said maximum radial height of the grooved block.

3. The tire according to claim 2, wherein an intended rotation direction of the tire is specified, said short section comprises an axially inner part located on the axially inside of the tall section, and a heel-side part located on a heel-side of the tall section excluding the axially inner part, said grooved block satisfies the following condition (1):

$$E \times ML/S > 2.0$$

wherein

S is the total (sq.mm) of the area of the higher top surface and the area of the lower top surface, ML is the maximum length (mm) in the tire circumferential direction of the grooved block, and E is the total length (mm) of the axial components of effective heel-side edges of the grooved block, which is the sum of the following lengths E1 to E6:

the length E1 of the axial component of a heel-side block edge of the axially inner part;

the length E2 of the axial component of a heel-side block edge of the heel-side part;

the length E3 of the axial component of a heel-side block edge of the tall section;

the length E4 of the axial component of a heel-side block edge formed by the second groove;

the length E5 of the axial component of a heel-side block edge formed by the zoning groove and positioned axially inside the tall section; and the length E6 of the axial component of a heel-side block edge formed by the zoning groove and positioned axially outside the tall section.

4. The tire according to claim 3, wherein the grooved block satisfies the following condition (2):

$$D \times ML/S > 0.18$$

wherein D is the smallest value of widths of the tall section and the short section.

5. The tire according to claim 4, wherein the grooved block satisfies the following condition (3):

$$D \times MW/S > 0.18$$

wherein MW is the maximum axial width of the grooved block.

6. The tire according to claim 2, which is a motorcycle tire for running on rough terrain.

7. The tire according to claim 3, which is a motorcycle tire for running on rough terrain.

8. The tire according to claim 4, which is a motorcycle tire for running on rough terrain.

9. The tire according to claim 5, which is a motorcycle tire for running on rough terrain.

10. The tire according to claim 1, wherein the tall section of each of the grooved crown blocks is provided with a single second groove having a depth of less than 20% of said maximum radial height of the grooved block, and the second groove has an inner end terminated within the tall section and an open outer end positioned between said both ends of the zoning groove.

11. The tire according to claim 10, wherein all blocks disposed outside the crown region are the grooved blocks each not provided with the second groove.

12. The tire according to claim 10, wherein each of blocks disposed outside the crown region is the grooved block which is not provided with the second groove and whose both ends are positioned at an edge of the grooved block which edge is positioned axially inside said centroid and extending in the tire circumferential direction.

13. The tire according to claim 12, wherein an intended rotation direction of the tire is specified, said short section comprises an axially inner part located on the axially inside of the tall section, and a heel-side part located on a heel-side of the tall section excluding the axially inner part, said grooved block satisfies the following condition (1):

$$E \times ML/S > 2.0$$

wherein

S is the total (sq.mm) of the area of the higher top surface and the area of the lower top surface, ML is the maximum length (mm) in the tire circumferential direction of the grooved block, and E is the total length (mm) of the axial components of effective heel-side edges of the grooved block, which is the sum of the following lengths E1 to E6:

the length E1 of the axial component of a heel-side block edge of the axially inner part;

the length E2 of the axial component of a heel-side block edge of the heel-side part;

the length E3 of the axial component of a heel-side block edge of the tall section;

the length E4 of the axial component of a heel-side block edge formed by the second groove;

the length E5 of the axial component of a heel-side block edge formed by the zoning groove and positioned axially inside the tall section; and the length E6 of the axial component of a heel-side block edge formed by the zoning groove and positioned axially outside the tall section.

14. The tire according to claim 13, wherein said grooved block satisfies the following condition (2):

$$D \times ML/S > 0.18$$

wherein

D is the smallest value of widths of the tall section and the short section.

15. The tire according to claim 14, wherein said grooved block satisfies the following condition (3):

$$D \times MW/S > 0.18$$

wherein MW is the maximum axial width of the grooved block.

16. The tire according to claim 15, which is a motorcycle tire for running on rough terrain.

17. A tire comprising:

a tread portion provided with grooves so that the tread portion has a land ratio of from 18% to 35%, wherein all blocks disposed in the tread portion are grooved blocks each having a substantially rectangular shape in the top view thereof, and each of the grooved blocks is provided with a zoning groove which is U-shaped with both ends positioned at one of block edges, and which defines a tall section of the grooved block having a ground contacting higher top surface, and a short section of the grooved block having a ground contacting lower top surface positioned radially inside the higher top surface, wherein the grooved blocks are first grooved blocks each of which is provided with a single second groove in the tall section thereof, and second grooved blocks each of which is provided with no groove other than said zoning groove, wherein said second groove has an inner end terminated within the tall section and an open outer end positioned between said both ends of the zoning groove, a depth of said zoning groove measured from the lower top surface is less than 20% of a maximum radial height of the grooved block, and a depth of said second groove measured from the higher top surface is less than 20% of said maximum radial height of the grooved block, wherein the first grooved blocks are disposed on both sides of the tire equator so that the centroid of each higher top surface is positioned in a crown region of the tread portion which region is defined as being centered on the tire equator and having a developed axial width in a range from 25% to 75% of the developed tread width of the tread portion, and said one of block edges is positioned axially outside said centroid and extends in the tire circumferential direction, and the second grooved are disposed on both sides of the tire equator so that the centroid of each higher top surface is positioned outside the crown region, and said one of block edges is positioned axially inside said centroid and extends in the tire circumferential direction.

18. The tire according to claim 17, wherein the difference between the radial height of the higher top surface of the tall section which defines said maximum radial height and the radial height of the lower top surface of the short section is in a range from 0.3 to 3.0 mm.

19. The tire according to claim 18, wherein in each of the grooved blocks, the short section has a sidewall, and the tall section has a sidewall which protrudes from the sidewall of the short section.

20. The tire according to claim 19, wherein the tire is a motorcycle tire in which the tread portion is convexly curved so that the tread face between tread edges is curved so that the maximum cross sectional width of the tire occurs between the tread edges.

\* \* \* \* \*